2,860,124
PROCESS FOR PREPARING HIGHLY VISCOUS SOLUBLE POLYVINYLALCOHOLS

Werner Starck, Hofheim (Taunus), and Hans Starck, Frankfurt am Main, Germany, assignors to Farbwerke Hoechst Aktiengesellschaft vormals Meister Lucius & Bruning, Frankfurt, Germany, a corporation of Germany No Drawing. Application November 15, 1955
Serial No. 547,022

Claims priority, application Germany November 26, 1954

7 Claims. (Cl. 260—91.3)

The present invention relates to a process of preparing highly viscous soluble polyvinylalcohols.

Polyvinyl alcohol is a chemically interesting and technically very valuable substance containing hydroxyl groups. It corresponds to the formula:

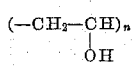

wherein $n$ is an integer which can vary within wide limits. Polyvinyl alcohol can be prepared from the corresponding ester compounds, preferably polyvinyl acetate, by alkaline or acid saponification or re-esterification according to the following scheme:

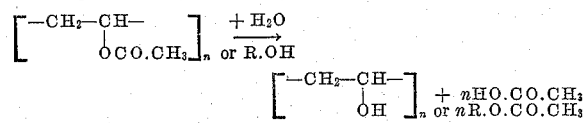

Owing to its good solubility in water, polyvinyl alcohol is frequently used as an emulsifier for the preparation of aqueous dispersions or emulsions. Its excellent age resistance and particular stability to anhydrous solvents enable polyvinyl alcohol to be suitably used for the manufacture of fibres, ribbons and foils which must be resistant to organic solvents, such as alcohols, ketones, substituted and unsubstituted hydrocarbons and various kinds of esters, i. e. to practically all organic compounds. Furthermore, polyvinyl alcohol is frequently used in the form of its aqueous solution, for example as a thickening agent in the textile industry, in pharmaceuticals and in cosmetics. In some fields of application, however, in which polyvinyl alcohol could otherwise suitably be used owing to its general properties, this use is restricted by the impossibility of preparing from polyvinyl alcohol highly viscous solutions of not too high a concentration. It is true that a series of processes has already become known to overcome this disadvantage, most of which processes are based on an after-treatment and, consequently, on a chemical change of the polyvinyl alcohol. Practically all these processes, which thus increase the viscosity of polyvinyl alcohol solutions, on the other hand impair other properties of the polyvinyl alcohol which are necessary for its industrial use, such as good solubility in water, colorless nature and stability, so that the value of the viscosity increase attained is considerably reduced. Polyvinyl alcohol is used especially as emulsifier in emulsion and dispersion polymerization, i. e. in a field of application where it is desired to have a fairly high viscosity associated with a fairly low concentration. Since in such polymerization processes it is preferred to treat monomers yielding colorless polymers, it is obvious that a discolored polyvinyl alcohol will have a detrimental effect. In addition thereto, such compounds may be subjected to a subsequent washing out process, so that a reduced capacity of the polyvinyl alcohol for solution in water likewise constitutes a disadvantage.

Furthermore, it is required that such polymerization processes be conducted within a wide pH-range, so that a polyvinyl alcohol solution which only retains its high viscosity within a limited pH-range, likewise cannot be used generally.

Now we have found that water-soluble polyvinyl alcohols which in an aqueous solution of 4 percent strength and at a temperature of 20° C. have a viscosity of more than 140 centipoises can be produced by saponifying in the manner known per se polyvinyl acetates which have been prepared in the presence of at least 0.8 percent of oleic acid peroxide calculated upon the monomer.

In this manner colorless and stable polyvinyl alcohols are obtained.

The amount of oleic acid peroxide added during the polymerization may be within the range of 0.8 percent to 8 percent. In British Patent No. 462,165 there is described the preparation of polyvinyl acetates by polymerization of vinyl acetate under the influence of oleic acid peroxide used in an amount of at most 0.25 percent. The said patent, however, neither describes nor suggests the possibility of preparing highly viscous polyvinyl alcohols. A close examination of the reactions described in the said patent shows that the saponification of polyvinyl acetates prepared according to said patent does not yield polyvinyl alcohols having a remarkably high viscosity. As experience has shown, it was not at all to be expected that the presence of an increased addition of catalyst in the polymerization of vinyl acetate to form polyvinyl acetate, and a corresponding saponification of the polyvinyl acetate obtained, would produce a polyvinyl alcohol, the viscosity of which is higher than that of a polyvinyl alcohol obtained by saponification of a polyvinyl acetate prepared by polymerization of vinyl acetate in the presence of a smaller amount of catalyst. It has generally been believed hitherto that the higher the polymerization degree, i. e. the index $n$ of the formula:

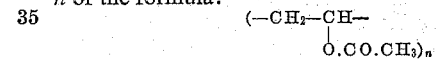

the higher is the viscosity of the polyvinyl alcohol obtained therefrom by saponification and corresponding to the formula:

Furthermore, the polymerization degree of the polyvinyl acetate is the higher, the lower the amount of catalyst during the polymerization, the same conditions being otherwise maintained.

By the more or less branched structure of the polyvinyl acetate due to a transfer mechanism, a minor variation of the index $n$ may occur, viz. a polyvinyl acetate having a higher index $n$ can yield a viscous polyvinyl alcohol of a lower viscosity than a polyvinyl acetate having a smaller index $n$, but this fact has no significance in the order of values in question.

On the contrary, however, with the polyvinyl alcohols prepared according to this invention from polyvinyl acetate, the differences are of a considerably higher order as is illustrated by the following table. The polyvinyl acetates used as starting material have been prepared by the so-called bulk-polymerization.

| Quantities of oleic acid peroxide used in the polymerization (in percent calculated on the vinyl acetate) | Viscosity, in 4% aqueous solution, of the polyvinyl alcohols, obtained from the polyvinyl acetates prepared according to the left-hand column, (centipoises) |
|---|---|
| 0.10 | 83 |
| 0.80 | 145 |
| 1.60 | 416 |
| 3.84 | 694 |
| 6.00 | 876 |

It results therefrom that the polymerization of vinyl acetate carried out in the presence of a quantity of catalyst increased by 60 times produces a product having a viscosity increased by 10 times, that is to say a viscosity value which could not be attained hitherto with polyvinyl alcohols not subjected to after-treatment.

Although the polyvinyl alcohols produced as above have been obtained by saponification of polyvinyl acetates prepared according to the bulk-polymerization process, the process of this invention is not limited to the use of polyvinyl acetates obtained by bulk-polymerization of vinyl acetate in the presence of at least 0.8 percent of oleic acid peroxide (calculated upon the vinyl acetate used), but products of grain or emulsion polymerization can also be used. As can be seen from the following table, especially the polyvinyl acetates prepared according to the grain polymerization process—the polymers being obtained in the form of depositing particles—constitute products which, after saponification, yield polyvinyl alcohols of a far higher viscosity still than do the corresponding polyvinyl acetates obtained by bulk-polymerization in the presence of the same amount of catalyst. (The conditions applied in the grain or emulsion polymerization of vinyl acetate are generally known.)

| Amount of oleic acid peroxide added in the polymerization (in percent calculated upon the monomer) | Viscosity, at 20° C in 4% aqueous solution, of the polyvinyl alcohol prepared from a— | |
|---|---|---|
| | bulk polymer, centipoises | grain polymer, centipoises |
| 3.83 | 700 | 4,000 |
| 0.80 | 145 | 350 |

Furthermore, it is not necessary to start and continue the polymeriaztion using exclusively pure oleic acid peroxide; the known catalysts usually used in the polymerization of vinyl acetate, such as benzoyl peroxide, can be used in conjunction with oleic acid peroxide.

The saponification or the equivalent re-esterification of polyvinyl acetates prepared in the presence of oleic acid peroxide alone or in admixture with other catalysts, which products yield highly viscous polyvinyl alcohols, can be conducted according to all known processes usually used for the saponification of polyvinyl acetates, that is to say in an alkaline or acid medium, in the presence of equivalent or catalytic quantities of a known saponification catalyst, in a purely aqueous or a purely organic or in a combined aqueous-organic phase, dissolved or dispersed, in the cold or in the hot. According to the invention, the saponification of the polyvinyl acetates may be complete or partial, always provided that the saponification products are soluble in water.

The oleic acid peroxide used in the described polymerization process, being a diacyl peroxide, is obtained in the usual manner, for example by reacting an oleic acid chloride with sodium peroxide. The reaction proceeds, for example, according to the following scheme:

$$2CH_3(CH_2)_7.CH=CH.(CH_2)_7-COCl + Na_2O_2 >$$
$$CH_3(CH_2)_7.CH=CH.(CH_2)_7CO.O.O.OC.(CH_2)_7.CH$$
$$=CH.(CH_2)_7.CH_3 + 2NaCl$$

The following examples serve to illustrate the invention, but they are not intended to limit it thereto, the parts being by weight unless otherwise stated, and the relation ship of parts by weight to parts by volume being the same as that of the kilogram to the liter:

*Example 1*

4.8 parts of oleic acid peroxide are dissolved in 250 parts of vinyl acetate. 30 parts by volume of the solution so obtained are placed in a polymerization vessel which is then introduced into a bath at 80° C. After said portion has been heated until reflux starts, the rest of the solution is added drop by drop within 4 hours while maintaining the bath temperature. Polymerization sets in vigorously and can be determined by the viscosity increase of the solution and by the falling off of the reflux. To complete the reaction, the reaction mixture is kept for a further 12 hours at a temperature of 70–80° C. The major part of the vinyl acetate has then been converted into the corresponding polymer. The last portions of unreacted monomer are then removed by distillation under reduced pressure and the polyvinyl acetate which is now brittle in the cold is removed from the polymerization vessel. The polymer obtained has a K-value of 63 (according to Fikentscher) and dissolves in the solvents usually used for polyvinyl acetate.

70 parts of the polyvinyl acetate thus prepared are dissolved in 400 parts of methanol and then added, within 45 minutes, to a boiling solution of 4.5 parts of methanolic sodium hydroxide of 20 percent strength in 225 parts of methanol. Polyvinyl alcohol separates out shortly after the addition of the above solution. To complete the saponification, the mixture is kept at boiling temperature for a further 15 hours while stirring. The pure, white polyvinyl alcohol which has precipitated, is then filtered off, washed with methanol and dried under reduced pressure. The yield amounts to 35 parts. The polyvinyl alcohol dissolves readily in water with moderate evolution of heat. The K-value is 76, the viscosity at 20° C. in 4 percent aqueous solution is surprisingly high and amounts to 580 centipoises.

*Example 2*

A solution prepared from 600 parts of vinyl acetate and 23 parts of oleic acid peroxide is added dropwise, within 80 minutes, while stirring rapidly, to 900 parts of a 0.1 percent solution of the ammonium salt of a styrene-maleic acid anhydride co-polymer, heated to 75° C. Immediately after the commencement of the addition of the vinyl acetate, polymerization sets in, becoming obvious first by turbidity of the mixture and then by the separation of granular polymer particles. After the addition is complete, the mixture is kept for a further 6–7 hours at 70–75° C. while stirring rapidly, the un-reacted monomer is eliminated by blowing in air or by steam distillation, the mixture is diluted with about 500 parts by volume of water, then cooled and poured into 5000 parts by volume of water. The polymer which has separated in the form of grains is freed from the adhering emulsifier by washing with water, then filtered off and dried. It has a K-value of only 52 and like the polymer of Example 1, dissolves in the solvents usually used for polyvinyl acetate.

200 parts of the polymer described above are added, while stirring, within 3 hours, at room temperature, i. e. at about 20° C, to a solution prepared from 430 parts of methanol and 40 parts of methanolic sodium hydroxide of 15 percent strength and stirring is continued for a further 12 hours at room temperature. The separated polyvinyl alcohol is filtered off, washed and dried. It has a K-value of 77 and in 4 percent aqueous solution has a viscosity of 5000 centipoises which greatly exceeds the viscosity of the polyvinyl alcohol prepared according to Example 1, notwithstanding that the K-values of the corresponding polyvinyl acetates hardly differ from one another.

We claim:

1. The process for the production of a water-soluble polyvinyl alcohol which in an aqueous solution of 4% strength and at a temperature of 20° C. has a viscosity of more than 140 centipoises, which comprises polymerizing vinyl acetate in the presence of 0.8 to 8.0% of oleic acid peroxide calculated upon the weight of the vinyl acetate, and saponifying the resulting polyvinyl acetate to yield a water-soluble saponification product.

2. The process for the production of a water-soluble polyvinyl alcohol which in an aqueous solution of 4% strength and at a temperature of 20° C. has a viscosity of more than 140 centipoises, which comprises polymerizing vinyl acetate in the presence of 0.8 to 8.0 percent of oleic acid peroxide calculated upon the weight of the vinyl acetate, and substantially completely saponifying the resulting polyvinyl acetate.

3. The process for the production of a water-soluble polyvinyl alcohol which in an aqueous solution of 4% strength and at a temperature of 20° C. has a viscosity of more than 140 centipoises, which comprises polymerizing substantially undissolved vinyl acetate with a dispersing agent therefor and in water as dispersing medium in the presence of 0.8 to 8.0 percent of oleic acid peroxide calculated upon the weight of the vinyl acetate, and saponifying the resulting polyvinyl acetate to yield a water-soluble saponification product.

4. The process claimed as in claim 3, wherein the vinyl acetate is polymerized into a stable dispersion, and the polyvinyl acetate dispersion is saponified to yield a water-soluble saponification product.

5. The process for the production of a water-soluble polyvinyl alcohol which in an aqueous solution of 4% strength and at a temperature of 20° C. has a viscosity of more than 140 centipoises, which comprises polymerizing substantially undissolved vinyl acetate in a dispersing medium comprising water containing an ammonia salt of a styrene maleic anhydride copolymer as dispersing agent and in the presence of 0.8 to 8.0 percent of oleic acid peroxide calculated upon the weight of the vinyl acetate, and saponifying the resulting polyvinyl acetate to yield a water-soluble saponification product.

6. The process for the production of a water-soluble polyvinyl alcohol which in an aqueous solution of 4% strength and at a temperature of 20° C. has a viscosity of more than 140 centipoises, which comprises polymerizing liquid vinyl acetate in bulk in the presence of 0.8 to 8.0 percent of oleic acid peroxide calculated upon the weight of the vinyl acetate, and saponifying the resulting polyvinyl acetate to yield a water-soluble saponification product.

7. In the preparation of water-soluble polyvinyl alcohol wherein vinyl acetate is polymerized in the presence of an organic acid peroxide to polyvinyl acetate, and the polyvinyl acetate is saponified to water-soluble polyvinyl alcohol, the improvement which comprises effecting the polymerization in the presence of 0.8 to 8.0 percent of oleic acid peroxide calculated upon the weight of the vinyl acetate, whereby the resulting polyvinyl alcohol when dissolved in water at 20° C. to a concentration of 4% has a viscosity of more than 140 centipoises.

References Cited in the file of this patent

UNITED STATES PATENTS

| 2,661,363 | Dickey | Dec. 1, 1953 |
| 2,668,809 | Bryant et al. | Feb. 9, 1954 |

FOREIGN PATENTS

| 462,165 | Great Britain | Feb. 26, 1937 |